(12) United States Patent
Drews et al.

(10) Patent No.: US 12,413,053 B2
(45) Date of Patent: Sep. 9, 2025

(54) INSULATED EARTHING SWITCH FOR AN AIR INSULATED OR MIXED SWITCHGEAR

(71) Applicant: GENERAL ELECTRIC COMPANY, Schenectady, NY (US)

(72) Inventors: Lutz Drews, Dransfeld (DE); Detlef Braun, Körle (DE)

(73) Assignee: GE VERNOVA INFRASTRUCTURE TECHNOLOGY LLC, Greenville, SC (US)

(*) Notice: Subject to any disclaimer, the term of this patent is extended or adjusted under 35 U.S.C. 154(b) by 233 days.

(21) Appl. No.: 18/326,478

(22) Filed: May 31, 2023

(65) Prior Publication Data
US 2023/0396043 A1 Dec. 7, 2023

(30) Foreign Application Priority Data
Jun. 2, 2022 (EP) .................................... 22177030

(51) Int. Cl.
*H02B 13/035* (2006.01)
*H02B 13/045* (2006.01)
*H02B 13/075* (2006.01)

(52) U.S. Cl.
CPC ....... *H02B 13/075* (2013.01); *H02B 13/0358* (2013.01); *H02B 13/045* (2013.01)

(58) Field of Classification Search
CPC .............. H02B 13/075; H02B 13/0358; H02B 13/045; H02B 13/02; H02B 13/055; H01H 31/10; H01H 31/003; H01H 31/32; H01H 33/021; H01H 33/52; H01H 33/565; H01H 33/56; H01H 3/40

USPC ........ 218/79, 80, 12, 13, 37, 43, 55, 67, 68, 218/100
See application file for complete search history.

(56) References Cited

U.S. PATENT DOCUMENTS

| | | | | |
|---|---|---|---|---|
| 3,761,651 | A * | 9/1973 | Fournier | H02B 13/075 200/82 R |
| 3,806,682 | A * | 4/1974 | Mauthe | H02B 13/075 218/79 |
| 4,486,634 | A * | 12/1984 | Nakano | H01H 9/20 200/50.02 |
| 7,122,758 | B2 * | 10/2006 | Schweizer | H01H 31/003 218/79 |
| 8,552,317 | B2 * | 10/2013 | Zwicky | H01H 31/003 200/48 R |

(Continued)

FOREIGN PATENT DOCUMENTS

| | | |
|---|---|---|
| EP | 1569256 A1 | 8/2005 |
| EP | 2597662 A1 | 5/2013 |

OTHER PUBLICATIONS

Extended European Search Report issued in EP Application No. 22177030.8 dated Oct. 31, 2022, 5 pages.

*Primary Examiner* — William A Bolton
(74) *Attorney, Agent, or Firm* — Eversheds Sutherland (US) LLP

(57) ABSTRACT

The application concerns an air insulated or mixed air and gas insulated switchgear assembly including a switchgear and an earthing switch. The switchgear includes a switchgear housing. The earthing switch includes a switch housing. The earthing switch includes an insulator flange including a metallic body and a dielectric insulating layer on the metallic body. The switch housing is mechanically connected to the switchgear housing through the insulator flange.

12 Claims, 5 Drawing Sheets

(56) References Cited

U.S. PATENT DOCUMENTS

| | | | |
|---|---|---|---|
| 8,624,146 B2* | 1/2014 | Kuhl | H01H 31/003 |
| | | | 218/79 |
| 2004/0042158 A1* | 3/2004 | Otsuka | H01H 31/32 |
| | | | 361/605 |
| 2021/0194224 A1* | 6/2021 | Fujioka | H01H 31/26 |

* cited by examiner

INSULATED EARTHING SWITCH FOR AN AIR INSULATED OR MIXED SWITCHGEAR

TECHNICAL FIELD

The invention belongs to the field of medium to high-voltage technology, i.e., 52 kV or higher. In particular, the invention relates to electrical insulation for air-insulated switchgear assemblies (AIS) or mixed air and gas insulated switchgear assemblies.

BACKGROUND

FIG. 1 shows an existing gas insulated switchgear assembly 5. Such a gas insulated assembly has to withstand higher voltage than an air-insulated switchgear assembly or a mixed switchgear assembly.

The gas insulated switchgear assembly 5 includes an insulating earthing switch 15 and a gas insulated switchgear 2. The earthing switch 15 is separated from the housing 3 of the gas insulated switchgear 2 by an insulator 17 which is made of plastic material such as an epoxy resin.

During normal operation, the earthing switch 5 is electrically connected to the gas insulated switchgear 2 by a ground connection 19. The ground connection 19 is a short circuit bridge between an earthing switch housing 13 and a switchgear housing 3.

For measurements in which a measured signal is applied to or tapped off over the contact system of the insulating earthing switch 15, the ground connection 19 is removed.

Such an existing insulated earthing switch has a limited resilience to outdoor application. In particular, the insulator of the earthing switch has limited mechanical resistance and it may break. Besides, the earthing switch has limited environmental durability because of the plastic material insulator.

SUMMARY

The invention relates to an air insulated or mixed air and gas insulated switchgear assembly. The switchgear assembly includes an air insulated or mixed air and gas insulated switchgear and an earthing switch. The switchgear includes a switchgear housing and a central conductor extending within the switchgear housing. The earthing switch includes a switch housing, a movable contact rod and a fixed electrical contact. The fixed electrical contact is secured to the central conductor. The movable contact rod is movable relative to the switch housing and to the fixed electrical contact.

The movable contact rod electrically engages the fixed electrical contact when the earthing switch is in a closed position. The movable contact rod is electrically disconnected from the fixed electrical contact when the earthing switch is an opened position.

According to the invention, the earthing switch includes an insulator flange comprising a metallic body and a dielectric insulating layer on the metallic body, and the switch housing is mechanically connected to the switchgear housing through the insulator flange.

Thanks to the insulator flange of the gas insulated switchgear assembly of the invention, the earthing switch has a higher resilience to outdoor applications. In particular, the insulator flange has high mechanical resistance and it will not break easily. The insulator flange may be easily recycled. The insulated earthing switch has higher environmental durability.

Preferred features of the invention are recited in the dependent claims.

BRIEF DESCRIPTION OF THE DRAWINGS

This invention will be better understood after reading the following description of example embodiments that are in no way limitative, wherein.

DETAILED DESCRIPTION

Figure 1:
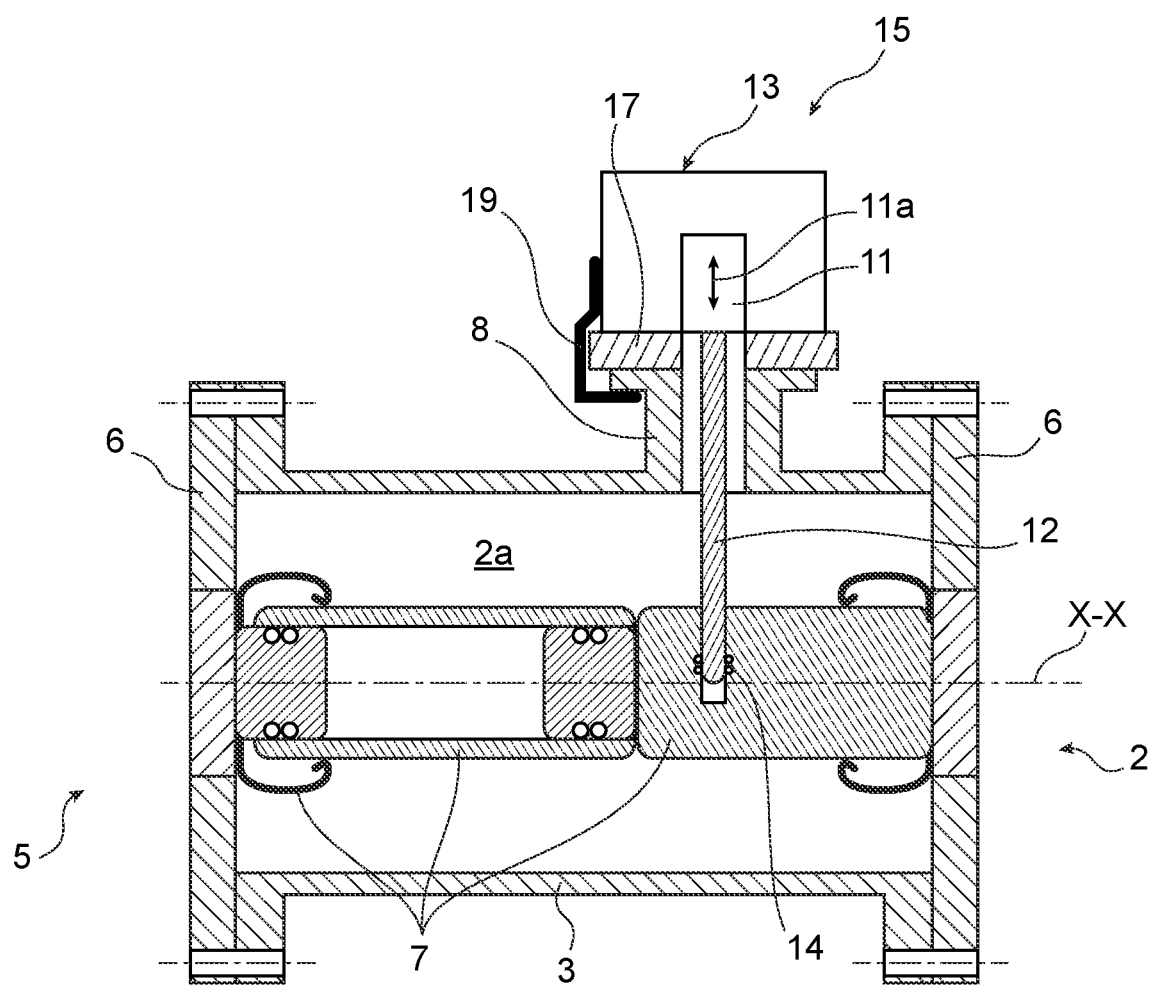
FIG. 1 schematically and partially shows a known gas insulated switchgear assembly in longitudinal cross section.
Figure 2:
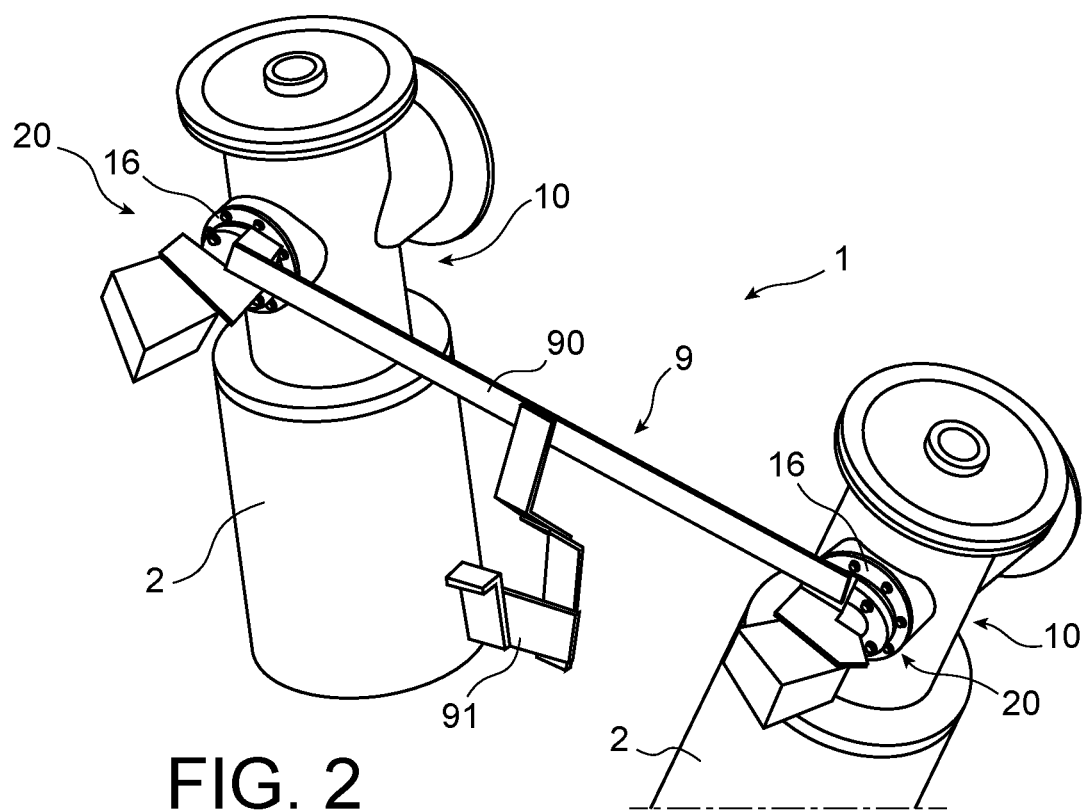
FIG. 2 schematically shows a portion of a gas insulated switchgear assembly according to a first embodiment of the invention in a perspective view.
Figure 3:
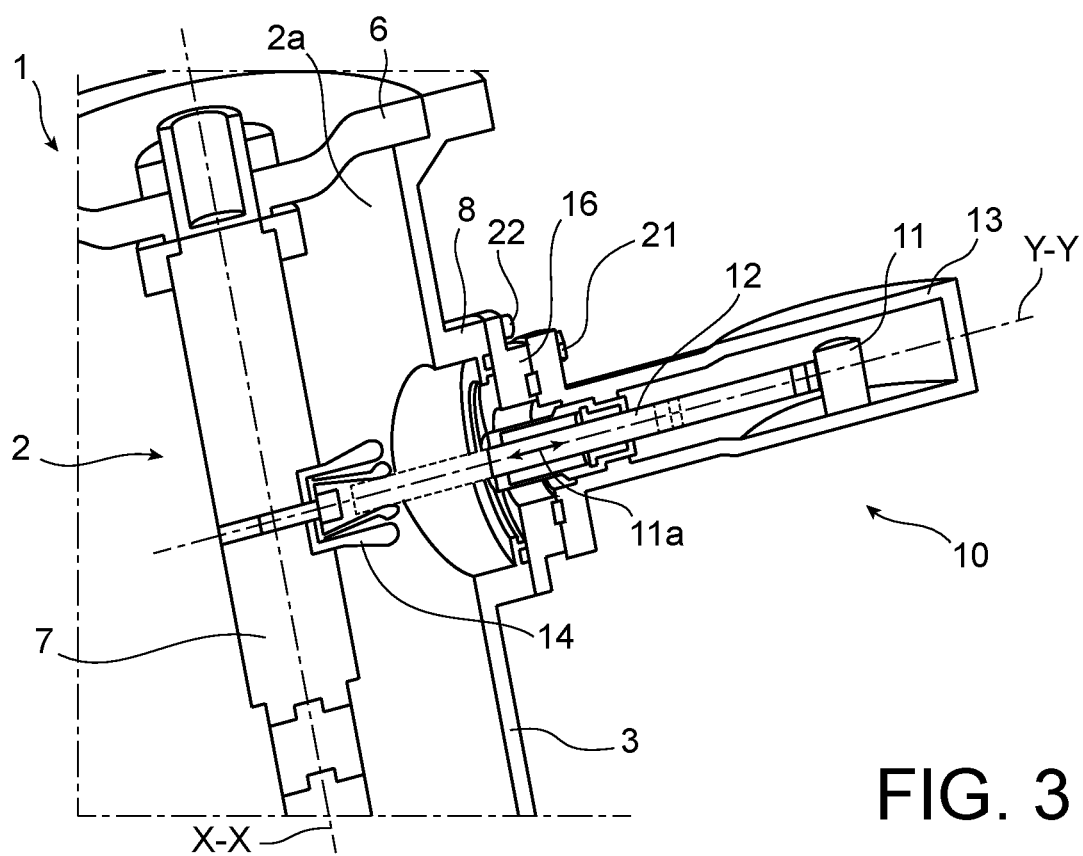
FIG. 3 schematically shows a portion of the gas insulated switchgear assembly according to a first embodiment of the invention in longitudinal cross section.
Figure 4:
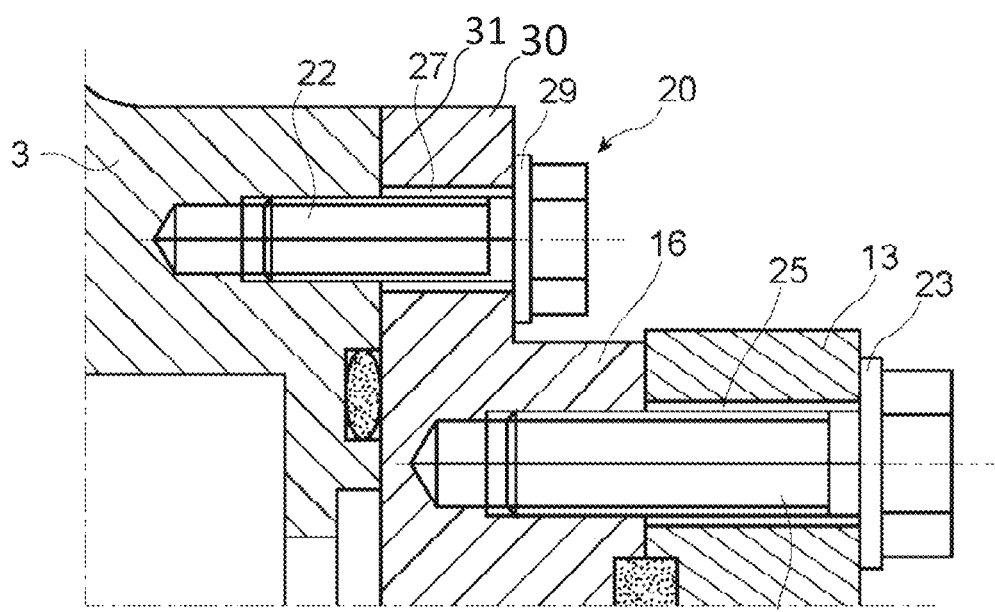
FIG. 4 schematically shows a portion of the connection between a switchgear and an earthing switch of the switchgear assembly according to the first embodiment and in cross section.

FIGS. 2 to 4 show an air insulated or mixed air and gas insulated switchgear assembly 1. The gas is an arc extinguishing gas such as SF6 or such as a mixture of fluoronitrile, fluoroketones, carbon dioxide and/or dioxygen.

The switchgear assembly 1 includes an air insulated or mixed air and gas insulated switchgear 2 for each phase of an AC electric line, an earthing switch 10 for each phase of the AC electric line, a ground connection 9 and fasteners 20.

Each switchgear 2 includes a switchgear housing 3, a central conductor 7 and insulator walls 6.

FIG. 3 shows more specifically a switchgear 2 and an earthing switch 10 of one of the phases of the AC electric line.

With reference to FIG. 3, the switchgear housing 3 encloses a gas chamber 2a which is filled by air or a mix of air and gas. The switchgear housing 3 includes a mounting flange 8 to which the earthing switch 10 is fixed. The switchgear housing 3 surrounds the central conductor 7. The switchgear housing 3 is connected to the ground independently from the earthing switch 10.

The central conductor 7 includes electrically active parts of the switchgear 2. The central conductor 7 extends longitudinally along the longitudinal direction X-X of the switchgear.

The insulator walls 6 each hold the central conductor 2 relative to the switchgear housing 3. The insulator walls 6 each extend radially relative to the longitudinal direction X-X of the switchgear between the central conductor 7 and the switchgear housing 3.

With reference to FIG. 2 and FIG. 3, each earthing switch 10 includes a switch housing 13, a movable contact rod 12, a drive mechanism 11, a fixed electrical contact 14 and an insulator flange 16. Each earthing switch 10 is configured to ground the central conductor 7 of the switchgear 2 of the corresponding phase.

In the disclosed embodiment, the longitudinal direction Y-Y of the earthing switch is substantially perpendicular to the longitudinal direction X-X of the switchgear of the corresponding phase.

With reference to FIG. 3, the switch housing 13 encloses at least part of the movable contact rod 12 and at least part of the drive mechanism 11. The switch housing 13 is fixed to the switchgear housing 13 by the insulator flange 16 and by the fasteners 20.

The fixed electrical contact 14 is fixed to the central conductor 7. The fixed electrical contact 14 is for example a tulip type female conductor. In particular, the fixed electrical contact 14 may comprise contact fingers for grasping the movable contact rod 14.

The movable contact rod 12 is annular along the longitudinal direction Y-Y of the earthing switch.

The movable contact rod 12 is movable along the longitudinal direction Y-Y of the earthing switch relative to the switch housing 13 and to the fixed electrical contact 14 between an elongated position and a retracted position.

The movable contact rod 12 in the elongated position electrically and mechanically engages the fixed electrical contact 14. When the movable contact rod 12 electrically engages the fixed electrical contact 14, the earthing switch 10 is in a closed position.

The movable contact rod 12 in the retracted position is electrically disconnected from the fixed electrical contact. When the movable contact rod 12 is electrically disconnected from the fixed electrical contact 14, the earthing switch 10 is an opened position.

The drive mechanism 11 is configured to move the movable contact rod 12 relative to the switch housing 13 and to the fixed electrical contact 14 between the elongated position and the retracted position with a drive movement 11a along the longitudinal direction Y-Y of the earthing switch.

The insulator flange 16 comprises a metallic body 30 and a dielectric insulating layer 31. The switch housing 13 is mechanically connected to the switchgear housing 3 through the insulator flange 16. The insulator flange 16 electrically insulates the switchgear housing 3 from the switch housing 13.

The electrically insulating layer 31 covers entirely the metallic body 30 in the disclosed embodiment. The electrically insulating layer 31 forms the entire external surface of the insulator flange 16 in the disclosed embodiment.

The insulating layer 31 includes an oxidation layer. In the first disclosed embodiment, the oxidation layer is made from the same metallic material as the metallic material of the metallic body 30 of the insulator flange 16.

The oxidation layer is made by anodic oxidation of the metallic body 30 of the insulator flange 16. The metallic body 30 is for example made of aluminum and the oxidation layer is for example made by hard anodization of the metallic body 30. The oxidation layer is in particular made of alumina in that case.

The fasteners 20 include first fasteners 21, 23, 27 and second fasteners 22, 25, 29. The fasteners 20 fasten the switch housing 13 to the switchgear housing 3 through the insulator flange 16.

The first fasteners 21, 23, 27 are arranged in a first circular row for fastening the switch housing 13 to the insulator flange 16. The first fasteners each include a metallic screw 21, a metallic washer 23 and a metallic peg 29 in the disclosed embodiment.

The second fasteners 22, 25, 29 are arranged in a second circular row concentric with the first circular row and radially spaced from the first circular row. The second fasteners 22, 25, 29 fasten the insulator flange 16 to the switchgear housing 3.

The second fasteners 22, 23, 25 are insulated fasteners 22, 25, 29. The second fasteners each include a metallic screw 22, a dielectric insulating washer 25 and a dielectric insulating peg 29.

The dielectric insulating washer 25 are each made of a material containing plastic. The dielectric insulating peg 29 are also made of a material containing plastic. The dielectric insulating washer 25 and dielectric insulating peg 29 are configured to limit wear of the insulating layer 31. They also contribute to electrically insulating the switchgear housing 3 from the switch housing 13.

The ground connection includes an earthing frame 9. The ground connection 9 is configured to electrically insulate the switchgear housing 3 from the switch housing 13 together with the insulator flange 16.

The ground connection 9 is configured to electrically connect the switch housing 13 to the ground, when the earthing switch 10 is in the opened position and when the earthing switch 10 is in the closed position. The ground connection 9 is electrically disconnected from the switchgear housing 3.

The earthing frame 9 is secured to the earthing switch 10 housing 13 of each phase. The earthing frame 9 includes earthing rods 90 and an earth connection 91.

The earthing rods 90 each extend between two earthing switch housings 13 of two different phases of the switchgear assembly 1. The earth connection 91 connects the earthing rods 90 to the ground independently from each switchgear housing 3.

Figure 5A:
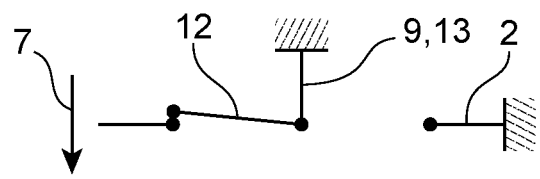
FIG. 5a is a schematic circuit diagram of the gas insulated switchgear assembly of the first embodiment when the earthing switch is in a closed position.

With reference to FIG. 5a, the ground connection 9 is electrically connected to the central conductor 7, to the movable contact rod 12 and to the switch housing 13, when the earthing switch 10 is in the closed position.

During grounding operation of the switchgear assembly 1, each earthing switch 10 is closed and each movable rod 12 is in the elongated position.

Figure 5B:
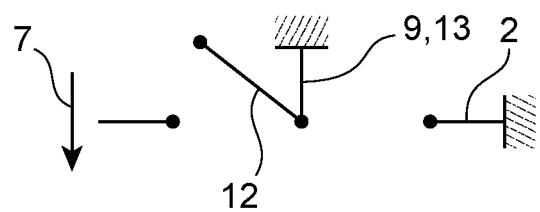
FIG. 5b is a schematic circuit diagram of the gas insulated switchgear assembly of the first embodiment in an opened position during normal operation of the switchgear assembly.

With reference to FIG. 5b, the ground connection 9 is electrically connected to the movable contact rod 12 and to the switch housing 13, when the earthing switch 10 is in the opened position.

During normal operation of the switchgear assembly 1, each earthing switch 10 is opened and each movable rod 12 is in the retracted position. The central conductor 7 of each switchgear 2 is under medium to high voltage and/or current.

Thanks to each insulator flanges 16 of the gas insulated switchgear assembly, each earthing switch 10 has a higher resilience to outdoor applications. In particular, the insulator flange 16 has high mechanical resistance and it will not break easily. The insulator flange 16 may be easily recycled. The earthing switch 10 has thus higher environmental durability.

The above described embodiments may of course be modified by the man of ordinary skill in the art.

The insulator flange 16 may be deprived of electrically insulating layer 31 near the fasteners 20. At the very least, the electrically insulating layer 31 covers the metallic body 30 at least on a first contact surface of the insulator flange 16 with the switchgear housing 3. In addition or alternatively, the electrically insulating layer 31 covers the metallic body 30 at least on a second contact surface of the insulator flange 16 with the switch housing 13.

The insulator layer may include a dielectric coating, instead of and in addition to the oxidation layer.

The oxidation layer may be made of another metallic material from the metallic material of the metallic body 30 of the insulator flange 16, for example when the oxidation layer is deposited or cladded onto the metallic body 30.

The fasteners 20 may include a rivet, a pin and/or a nut and in addition to or instead of screws and pegs.

The first fasteners 21, 23, 27 may be insulated fasteners and/or the second fasteners 22, 23, 25 may be non-insulated metallic fasteners.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. An air insulated or mixed air and gas insulated switchgear assembly, comprising:
    an air insulated or mixed air and gas insulated switchgear comprising a switchgear housing and a central conductor extending within the switchgear housing;
    an earthing switch comprising a switch housing, a movable contact rod and a fixed electrical contact;
    wherein the fixed electrical contact is secured to the central conductor;
    wherein the movable contact rod is movable relative to the switch housing and to the fixed electrical contact;
    wherein the movable contact rod electrically engages the fixed electrical contact when the earthing switch is in a closed position, and wherein the movable contact rod is electrically disconnected from the fixed electrical contact when the earthing switch is an opened position;
    wherein the earthing switch comprises an insulator flange comprising a metallic body and a dielectric insulating layer on the metallic body, and in that the switch housing is mechanically connected to the switchgear housing through the insulator flange.

2. The switchgear assembly according to claim 1, wherein the dielectric insulating layer forms substantially an entire external surface of the insulator flange.

3. The switchgear assembly according to claim 1, wherein the dielectric insulating layer comprises an oxidation layer,
    wherein the oxidation layer is preferably made from a same metallic material as a metallic material of the metallic body.

4. The switchgear assembly according to claim 3, wherein the oxidation layer is made by anodic oxidation of the metallic body of the insulator flange.

5. The switchgear assembly according to claim 3, wherein the oxidation layer is made by hard anodization of the metallic body.

6. The switchgear assembly according to claim 1, wherein the switchgear assembly comprises fasteners for fastening the switch housing to the switchgear housing through the insulator flange.

7. The switchgear assembly according to claim 6, wherein the fasteners include first fasteners arranged in a first annular row for fastening the switch housing to the insulator flange, and
    wherein the fasteners include second fasteners arranged in a second annular row concentric with the first annular row and radially spaced from the first annular row, wherein the second fasteners fasten the insulator flange to the switchgear housing.

8. The switchgear assembly according to claim 6, wherein the fasteners include insulated fasteners each including a metallic screw and a dielectric insulating washer made of a material containing plastic.

9. The switchgear assembly according to claim 6, wherein the insulated fasteners each further include a dielectric insulating peg made of a material containing plastic.

10. The switchgear assembly according to claim 1, wherein the switchgear assembly comprises a ground connection for electrically connecting the switch housing to a ground, when the earthing switch is in the opened position and when the earthing switch is in the closed position.

11. The switchgear assembly according to claim 10, wherein the ground connection is electrically connected the central conductor, to the movable contact rod and to the switch housing when the earthing switch is in the closed position,
    wherein the ground connection is electrically disconnected from the switchgear housing when the earthing switch is in the opened position.

12. The switchgear assembly according to claim 10, wherein the switchgear assembly comprises an air insulated or mixed air and gas insulated switchgear for each phase of an AC electric line;
    wherein the switchgear assembly comprises an earthing switch for each phase of an AC electric line;
    wherein each switchgear includes a switchgear housing and a central conductor extending inside the switchgear housing;
    wherein each earthing switch comprising a switch housing, a movable contact rod, a fixed electrical contact, and an insulator flange comprising a metallic body and a dielectric insulating layer on the metallic body;
    wherein the ground connection comprises an earthing frame secured to the earthing switch housing of each phase, wherein the earthing frame comprises earthing rods each extending between two earthing switch housings of the switchgear assembly.

* * * * *